July 21, 1959 L. MOLLENBERG 2,896,144
TWO SPEED INDUCTION TYPE MOTOR
Filed March 24, 1958 3 Sheets-Sheet 1

Inventor:
Leroy Mollenberg,
by H. F. Manbeck, Jr
Attorney.

July 21, 1959   L. MOLLENBERG   2,896,144
TWO SPEED INDUCTION TYPE MOTOR

Filed March 24, 1958   3 Sheets-Sheet 2

Inventor:
Leroy Mollenberg,
by H. F. Manbeck, Jr.
Attorney.

July 21, 1959 L. MOLLENBERG 2,896,144
TWO SPEED INDUCTION TYPE MOTOR
Filed March 24, 1958 3 Sheets-Sheet 3

Inventor:
Leroy Mollenberg,
by H.F. Manbeck, Jr.
Attorney.

United States Patent Office 2,896,144
Patented July 21, 1959

2,896,144
TWO SPEED INDUCTION TYPE MOTOR

Leroy Mollenberg, Fort Wayne, Ind., assignor to General Electric Company, a corporation of New York Application March 24, 1958, Serial No. 723,281

6 Claims. (Cl. 318—224)

My invention relates to alternating current induction motors and more particularly to single phase motors of that type adapted to operate at two different speeds.

Two speed, single phase induction motors are customarily provided with two separate stator winding arrangements, one for the high speed operation of the motor and the other for the low speed operation. The one winding arrangement, when energized, produces the desired number of magnetic poles for the high speed operation, whereas the other winding, when energized, produces a different, higher number of poles for the low speed operation. It would be advantageous, however, both for ease and economy of manufacture, if the two speed operation could be obtained from a single winding arrangement. With fewer coil groups to wind and insert on the stator, the manufacturing process would necessarily be simpler and less expensive than with two winding arrangements.

It is well known that a single winding arangement can be used to produce two different motor speeds if reversing connections are provided for every other pole. When the poles are connected so that every other one is of opposite polarity, the motor will run at one speed, and when the poles are connected with like polarity, the motor will run at a lower speed, approximately half the first speed. Specifically, if all the poles of the winding are of the same polarity, an equal number of consequent poles are formed between them so that the motor operates as if it had twice as many poles as in the first connection. Single winding arrangements with reversing connections for every other pole have not been used commercially to any extent, however, because of the poor performance which is obtained for the consequent pole or low speed operation. In particular, the torque characteristics of the low speed operation of such motors have been unsatisfactory for almost all commercial applications. The M.M.F. produced when the primary poles are all of the same polarity is full of harmonics whereby the motor does not develop the desired torque or give a satisfactory over-all performance in other respects.

Accordingly, it is a general object of my invention to provide a new and improved winding arangement for a two speed motor, which will eliminate these difficulties heretofore found in the low speed, consequent pole operation; and it is a more specific object of my invention to provide a winding arrangement which will produce a satisfactory M.M.F. pattern for both connections of its poles, and thereby satisfactory operation of the motor at both speeds.

It is also an object of my invention to provide both a novel main winding and a novel start winding each of which will produce satisfactory M.M.F. patterns for two speeds of operation of a motor, and which may be combined in a single winding arrangement to provide a particularly desirable two speed motor.

In carrying out my invention, I provide a single phase induction motor including a magnetic core member having a plurality of slots. My new and improved winding arrangement is disposed in these slots so as to provide for operation of the motor at two different speeds. The arrangement includes a main winding and a start winding, both of which are provided with connections for reversing the polarity of every other pole. With the poles of the respective windings connected so that every other one is of opposite polarity, the motor runs at its higher speed; and with the poles connected to be of the same polarity, consequent poles are produced between them so that the motor runs at a lower speed.

Both the main and the start winding are arranged, by my invention, so that each produces a satisfactory M.M.F. pattern for both operations. To effect this result in the main winding, it is overpitched so that some of the outercoil sides of each pole are positioned in the same slots as the outer coil sides of the adjacent pole. This interspersing or overlapping of the outermost coil sides of the poles results in these coil sides producing additive M.M.F.'s for the higher speed operation of the motor and cancelling M.M.F.'s for the lower speed operation. M.M.F. patterns are thereby obtained for both the high speed operation and low speed operation, which are symmetrical and relatively free of harmonics.

In the start winding the desired M.M.F. patterns are obtained by providing a plurality of coil groups for each pole. The coil groups of each pole are displaced somewhat from each other so that their outer coil sides do not fit into the same slots. Also, there is an overlapping or interspersing of the outer coil sides of each pole with those of the adjacent pole so that they fit into the same solts. As the result of the displacement of the coil groups within each pole, and the overlapping effect between poles, the coil sides in certain slots produce a different M.M.F. effect during the high speed operation of the motor than during the low speed operation. This causes symmertical M.M.F. patterns, relatively free of harmonics, to be produced for both speeds of the motor.

With both the main winding and the start winding producing desirable M.M.F. patterns in both connections, the motor starts and runs efficiently and with good torque characteristics. Thus, a satisfactory two speed motor is provided with only a single winding arrangement. It will be understood, of course, that my novel main and start windings are most advantageously used together, but nonetheless they may find separate utility in certain motors and my invention is not necessarily limited to their combination.

The subject matter which I regard as my invention is particularly pointed out and distinctly claimed in the concluding part of this specification. My invention, however, both as to organization and method of operation, together with further objects and advantages thereof, may best be understood by reference to the following description taken in conjunction with the accompanying drawings in which:

Figure 4:
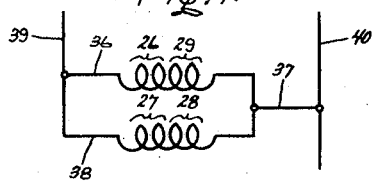
Fig. 4 is a schematic circuit diagram showing the connection of the primary poles of the starting winding of the motor for its two pole operation.
Figure 5:
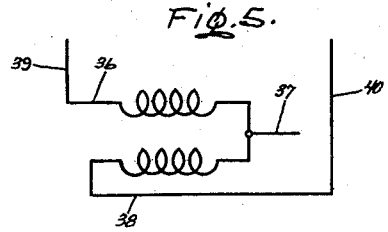
Fig. 5 is a similar diagram showing the connection of the primary poles of the starting winding for its four pole operation.
Figure 8:
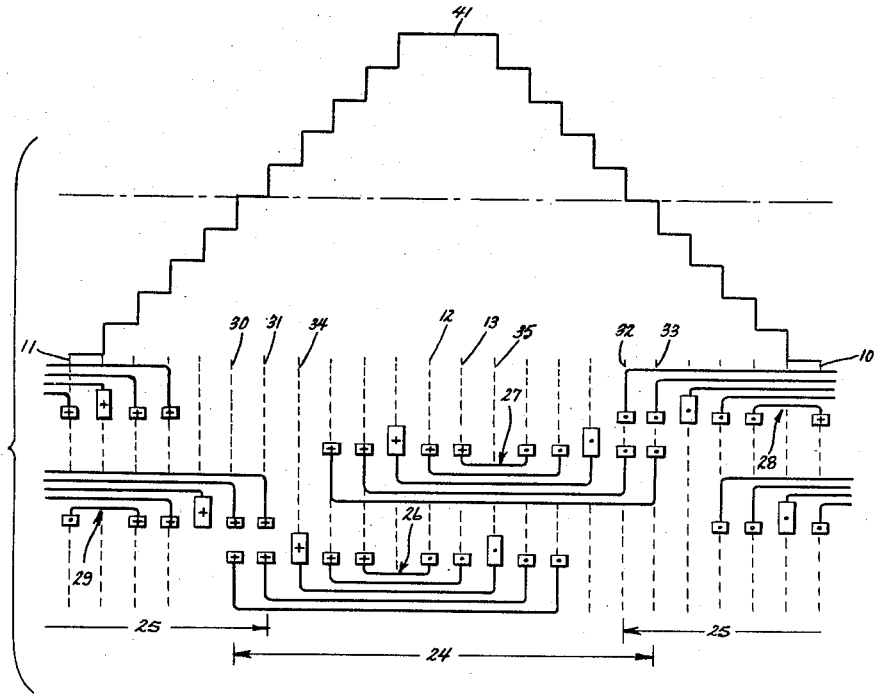
Figure 9:
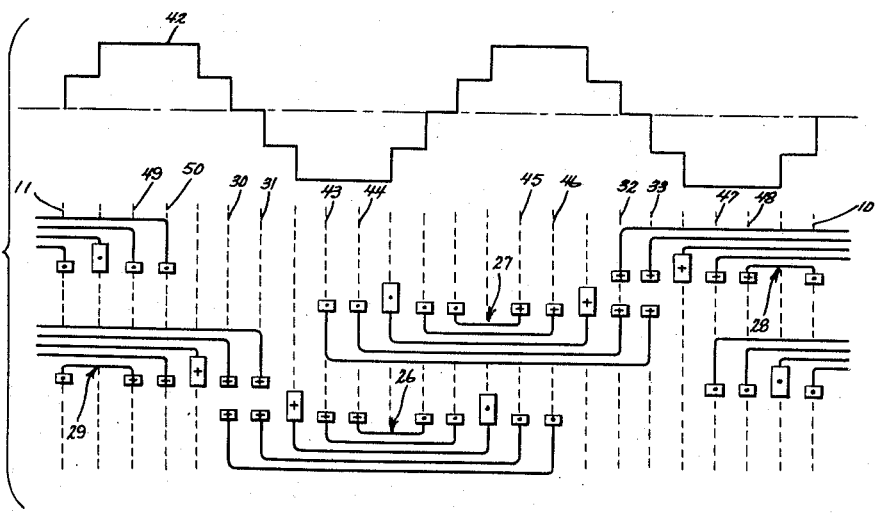

Fig. 8 is schmatic diagram showing the direction of current flow in the windings of the starting winding when it is connected as shown in Fig. 4, and further showing the two pole M.M.F. pattern produced thereby; and Fig. 9 is similar view for the starting winding showing the direction of current flow in its coils when it is connected as shown in Fig. 5, and the four pole M.M.F pattern produced thereby.

Figure 1:
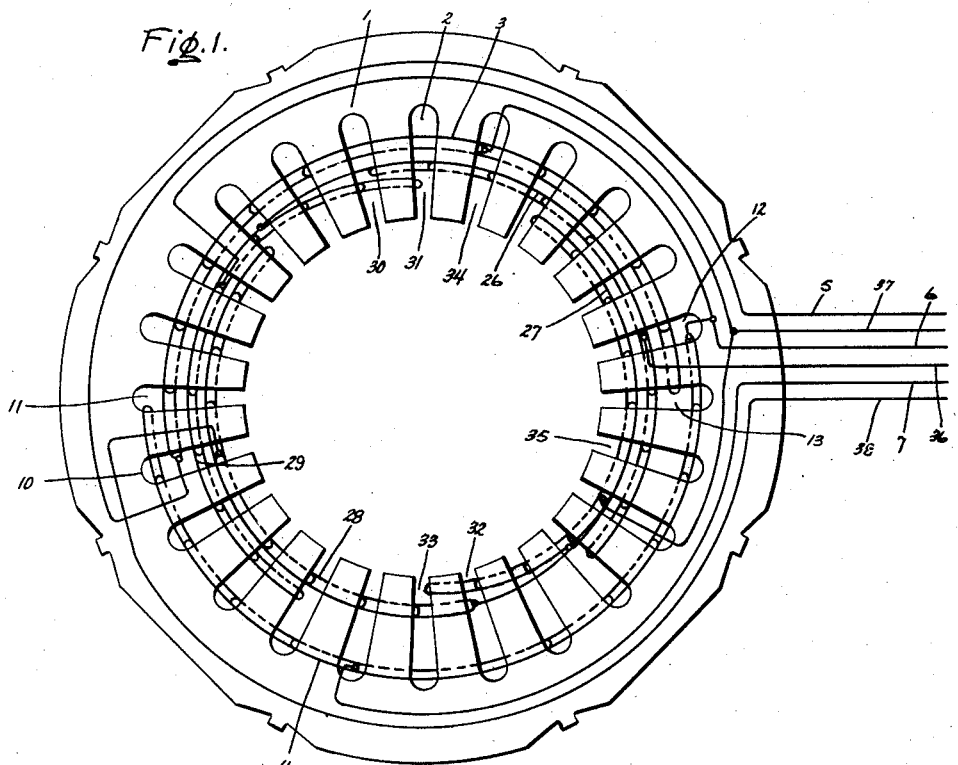
Fig. 1 is a schematic view of the core member of a single phase motor including a preferred embodiment of the improved winding arrangement of this invention, and adapted to run as either a two pole or a four pole machine.

Referring now to Fig. 1, there is shown therein a core member or stator 1 having a number of slots generally indicated at 2. Specifically, this core member has twenty four slots therein. Disposed in the slots 2 is a winding arrangement which embodies my invention in one form thereof. This arrangement includes a main winding which is arranged to form a pair of primary poles 3 and 4. Each of the poles 3 and 4 includes a plurality of concentric coils fitted into separate ones of the slots 2, and the coils are arranged for energization from a source of single phase alternating power through lead-in conductors 5, 6, and 7. The coils forming pole 3 are energized between the conductors 5 and 6 whereas the coils forming the pole 4 are connected between the conductors 6 and 7.

Figure 2:
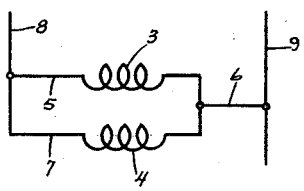
Fig. 2 is a schematic diagram showing the connection of the primary poles of the main winding of the motor for its two pole operation.

If the poles 3 and 4 are connected between a single phase source of alternating power 8, 9 as indicated in Fig. 2 so that the poles are energized in parallel between the conductors of the power supply, the pole 3 will be of one polarity whereas the pole 4 will be of the opposite polarity. In other words, a primary north pole will be formed and a primary south pole will be formed and no other poles whatsoever. Thus, the machine will operate as a two pole machine.

Figure 3:
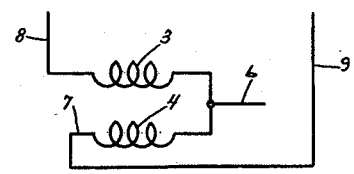
Fig. 3 is a schematic circuit diagram showing the connection of the primary poles of the main winding for its four pole operation.

If, however, the lead-in conductors are connected to the power supply 8, 9 as shown in Fig. 3 so that the coils of the poles 3 and 4 are connected serially between the power supply with the lead 5 connected to one side of the supply and the lead 7 to the other side then both the pole 3 and the pole 4 will be of like polarity. In other words two primary poles of the same polarity will be formed, and with both the primary poles being of like polarity, two consequent poles will be produced between them. The motor instead of acting as a two pole machine will then operate as a four pole machine, and thereby will run at a lower speed than when the coils are connected as shown in Fig. 2. It will, in fact operate at approximately half that speed.

In order to provide a desirable M.M.F. pattern for both the two pole operation and the "four pole" operation of the motor, I have provided a new and improved arrangement of the coils forming the poles 3 and 4. Specifically, these coils are so arranged so that some of the outer coil sides of each of the poles are positioned in the same slots as the outermost coil sides of the other pole. In simplified language I prefer to say that the outermost coils of the two poles are interspersed or overlapped.

Referring to Fig. 1, it will be seen that the outermost two coils of each of the poles 3 and 4 fit into the same slots. At their one ends they fit into the solts 10 and 11 and at their other ends they fit into the slots 12 and 13. In my preferred embodiments these outermost coils in the slots 10—13 include only half the number of turns of the inner coils of the poles, which are fitted into separate slots.

Figure 6:
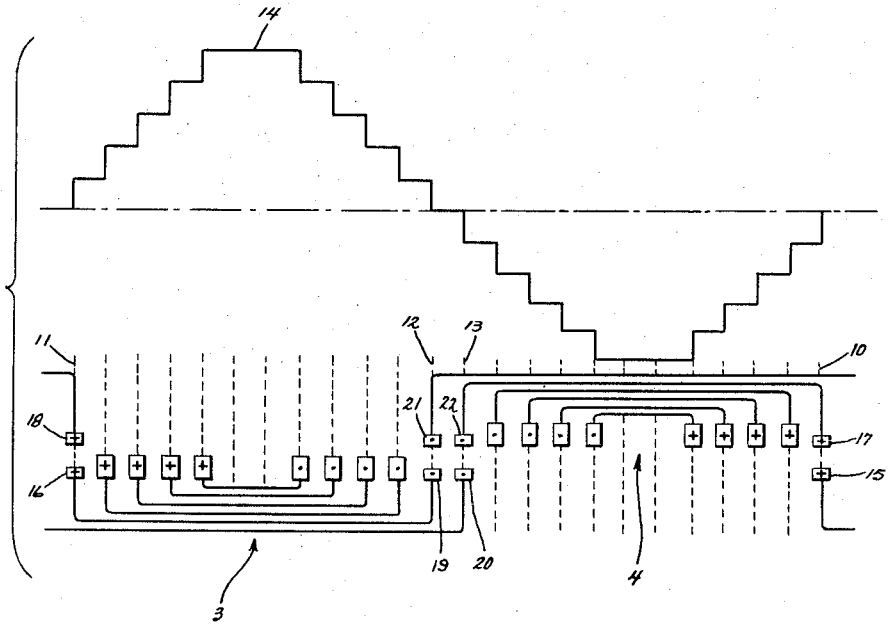
Fig. 6 is a schematic diagram showing the direction of current flow in the coils of the main winding when it is connected as shown in Fig. 2, and also showing the two pole M.M.F. pattern produced thereby.

Referring now to Fig. 6, there is shown therein in diagrammatic form the M.M.F. pattern 14 which is produced by poles 3 and 4 when they are connected as shown in Fig. 2. In this figure the slots 2 are indicated by the vertically extending dotted lines, and the coil sides in the various slots are indicated by the small rectangles on the dotted lines. The lines connecting the coil sides indicate the end turns of the coils. The relative direction of the current flow in the various coils is shown schematically in the diagram, and it will be noted that in this two pole connection the coil sides in the slots 10 and 11 have more or less additive effect in producing M.M.F. And so also do the coil sides in the slots 12 and 13. In this diagram the coil sides of the pole 3 in slots 10 and 11 are shown respectively at 15 and 16, and the coil sides of the pole 4 therein are shown at 17 and 18. Similarly, the coil sides of the coil 3 in slots 12 and 13 are shown at 19 and 20 and the coil sides of the pole 4 therein are shown at 21 and 22. The M.M.F. pattern 14 produced as a result of the energization of the poles 3 and 4 in this connection is symmetrical and is relatively free of harmonics, whereby the motor will operate with good efficiency as a two pole machine.

Figure 7:
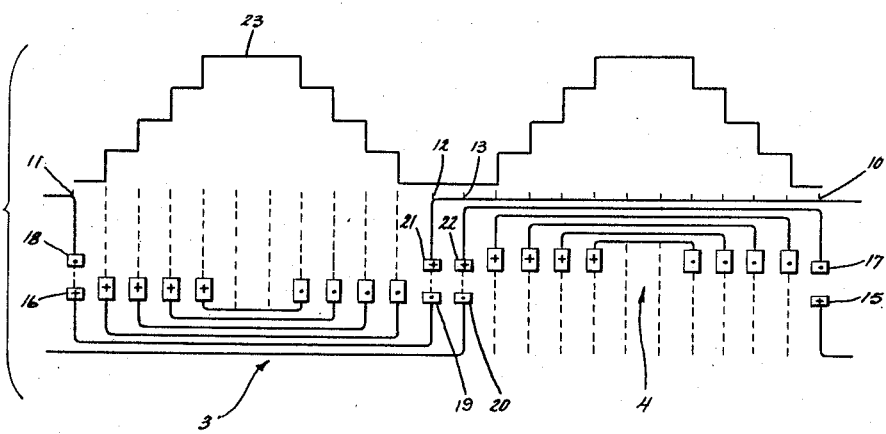
Fig. 7 is a similar diagram showing the direction of the current flow in the coils of the main winding when it is connected as shown in Fig. 3, and also showing the four pole M.M.F. pattern producted by this connection.

If it is desired to operate the motor as a "four pole" machine at reduced speed, then the energizing connections for the poles 3 and 4 are changed to those shown in Fig. 3. Specifically, the poles are connected in series, with lead 5 connected to line 8 of the power supply and lead 7 to line 9 of the power supply. The common lead 6, as shown, is not connected to the power supply. With these connections the relative direction of the current flow in the coils of the poles 3 and 4 is as indicated in Fig. 7. In this case not only is the polarity of the pole 4 reversed so that it becomes of the same porlaity as the pole 3, but also the coil sides in the slots 10—13 produce cancelling M.M.F.'s. The M.M.F. pattern thus does not change over them, and a resultant pattern is formed as indicated at 23. This pattern 23, it will be noted, includes two consequent poles formed in addition to the primary poles. In other words, there are now two north poles and two south poles. Moreover, and very important, as a result of the cancelling effect of the M.M.F.'s produced by the coil sides in slots 10—13, the the M.M.F. pattern is flat peaked over those slots and is symmetrical for the four poles so that there are relatively few harmonics in the pattern. Consequently, an efficient four pole operation of the machine is obtained at approximately half the speed of the two pole operation.

In the illustrated embodiment the coil sides 15, 16, 19 and 20 of the primary pole 3 are shown respectively in the slots 10—13 as positioned under the coil sides 17, 18, 21 and 22 of the primary pole 4. It will be understood, however, that this is only a matter of convenience for ease of winding, and that the relative top and bottom position of the coil sides in any of the slots 10—13 could be reversed without affecting the M.M.F. patterns produced. In other words, which coil side is at the top of the slot and which is at the bottom is immaterial so far as my invention is concerned.

By my invention there is also provided on the core member 1 a starting winding for producing a M.M.F. for aiding the main winding in starting and/or starting and running the motor. This starting winding is so arranged that it may be used for both the two pole and the four pole operation of the motor. In other words, for both the types of operation it produces an M.M.F. pattern which is spaced about ninety electrical degrees on the core member 1 from the M.M.F. pattern of the main winding. To obtain a suitable electrical phase angle between the two M.M.F. patterns a capacitor may be included in the starting winding circuit for producing a leading current in it.

It will be understood that the same distribution used in my new and improved main winding cannot be used, shifted by ninety electrical degrees, for the start winding. This is because the ninety degree shift of the two pole operation would become a shift of one hundred and eighty degrees for the four pole operation. Thus, a more complicated winding distribution must be provided which will give a ninety degree shift for both the two pole and the four pole operations.

Referring to Figs. 1 and 8, it will be seen that my improved starting winding comprises a winding which is inserted in the slots 2 so as to form two primary starting poles generally indicated at 24 and 25. Each of these primary starting poles is formed of a plurality of coil groups, with each of the groups including a plurality of concentric coils. Thus, the primary starting pole 24 is formed by coil groups 26 and 27, and the primary starting pole 25 is formed by the coil groups 28 and 29.

In accordance with my invention the coil groups of each of the primary starting poles are displaced from each other on the core 1. In other words, although the coil groups of each pole have certain coil sides fitting into common slots, each also has coil sides at one end which are fitted into slots not containing any coils from the other coil group. Thus, the coil group 26 of pole 24 is displaced counterclockwise three slots from the coil group 27. Similarly, the coil group 28 of pole 24 is displaced three slots counterclockwise from the coil group 29.

Besides the displacement between the two coil groups in each of the starting poles 24 and 25, there is also an overlapping or interspersing of the outer coil sides of the two poles themselves. In particular, on both sides of the poles the outer two coil sides thereof are fitted into the same slots. Thus the slots 30 and 31 each hold one coil side from the coil group 26 of pole 24 and one coil side from the coil group 29 of pole 25. Similarly, slots 32 and 33 each hold one coil side from the coil group 27 of pole 24 and one coil side from the coil group 28 of pole 25. In this way, my improved start winding includes an overlapping between the poles as well as a displacement of the two coil groups in each pole.

It will also be noted that in each coil group there is one coil having double the number of turns of the rest of the coils (see the schematic showing of Figs. 8 and 9). This latter coil is the center coil of each pole group. On both its sides it is fitted into a slot which does not contain any coil sides of the other coil group of the pole involved, or any coil sides of the other pole. Thus, for example, considering the coil group 26 and referring to both Figs. 1 and 8, it will be seen that it has a center coil of double the normal number of turns, whose one side fits into the slot 34 and whose other side fits into the slot 35. The rest of the coil groups all include a similar center coil as will be readily seen by reference to both Figs. 8 and 9.

In Figs. 8 and 9, the slots 2 in the core member are indicated by the vertical dotted lines, and the various coil sides of the coil groups are shown schematically as rectangles with the end turns linking them, so that it is apparent how the various coils are fitted into the slots. These schematic diagrams show with particular clarity the displacement of the coil groups of each pole one from another and also the manner in which the coils are arranged within any group. They further show the overlapping between the poles. Taking again the coil group 26 it will be readily seen how it is displaced from the other coil group 27 of pole 24 and how it overlaps the coil group 29 of pole 25. Likewise, it will be seen how the center coil of that group in slots 34 and 35 is of double the size of the other coils.

As shown in Fig. 1, coil group 26 of starting pole 24 and coil group 29 of starting pole 25 are energized serially between input leads 36 and 37. The remaining two coil groups of the starting winding, group 27 of starting pole 24 and group 28 of starting pole 25, are energized serially between the lead 37 and a second input lead 38. For two pole operation, these input leads 36, 37 and 38 are connected to power supply conductors 39, 40 as indicated in Fig. 4, so that the series connection of coil groups 26 and 29 is energized in parallel with the series connected groups 27 and 29. Specifically, the leads 36 and 38 are connected to the one supply conductor 39, and the common series lead 37 is connected to the other conductor 40. The supply conductors 39 and 40, it will be understood, are themselves energized from the power supply 8—9 through suitable starting and/or starting and running capacitors and, if desired, a motor operated centrifugal switch may also be included in the connection. The capacitors displace the phase angle of the current in the starting winding from that of the current in the main winding, and the motor centrifugal switch will open the starting winding circuit, or disconnect the starting capacitor only, when the motor comes up to speed.

With the coil groups of the starting winding connected as indicated in Fig. 4, the relative direction of current flow in their coils is as indicated in Fig. 8. And with this current flow through the coils a two pole M.M.F. pattern is produced such as is shown in Fig. 8. The M.M.F. pattern 41 is symmetrical, with the wave form for the north and south poles being the same, and it is displaced in space ninety electrical degrees from the wave of the M.M.F. pattern of the main winding of Fig. 6. Thereby it is effective in combination with the M.M.F. produced by the main winding to start, and/or start and run, the motor in its two pole operation.

It will be noted that as a result of the displacement of the two coil groups of each pole from each other, a M.M.F. cancelling effect is produced in certain slots of each pole, which include coil sides from both groups of the pole. Specifically, for each pole there are two slots including coil sides from both coil groups, in which the current is in one direction in the upper coil side and in the opposite direction in the lower coil side. These slots are, in particular, slots 12 and 13 for pole 24, and slots 10 and 11 for pole 25. The M.M.F.'s produced by these coil sides, due to their opposite currents, are cancelling so that they add nothing to M.M.F. wave. This results in the M.M.F. wave form not changing over them, and gives two flat peaks in the wave form, as shown in Fig. 8. These flat peaks are, of course, necessary to obtain a good wave form relatively free of harmonics. The overlapping coil sides from the two poles, i.e., the coil sides in slots 30—33, also contribute to the resultant M.M.F. wave or pattern 41. In them, the currents are in the same direction so that they produce additive rather than cancelling M.M.F.'s, thus contributing to an even progression of the wave form between the two peaks.

If it is desired to operate the machine as a four pole machine, then the coil groups of the starting winding are connected between the power supply conductors 39 and 40 as indicated in Fig. 5. Specifically, the lead 36 is connected to one side of the power supply, and the lead 38 to the other side of the power supply with no connection being made to the common lead 37. With the starting winding energized in this manner, the current through the coils is as indicated in the bottom portion of Fig. 9; and with this current flow through the coils an M.M.F. pattern is created such as is indicated in the upper portion of Fig. 9. This M.M.F. pattern or wave form 42 includes four poles, two of which are primary poles and the other two of which are consequent poles. Also, the pattern is displaced 90° electrically from the four pole M.M.F. pattern created by the main winding (see Fig. 7) and thereby it is effective in cooperation with the main M.M.F. pattern, to start, or start and run, the motor. This starting winding M.M.F. pattern for the four pole operation, like the wave form for the two pole operation, is symmetrical and relatively free from harmonics and thereby is quite advantageous.

In the four pole connection of the starting winding as in the two pole connection, there is an M.M.F cancelling effect in certain slots between the two coil groups of each pole. The cancelling effect, however, occurs in different slots than in the two pole operation; and there are four groups of two slots each in which it occurs, rather than only two groups of two slots each. Specifically, there is a cancelling effect between the coil sides of groups 26 and 27 (pole 24) in slots 43 and 44, and in slots 45 and 46. There is also a cancelling effect between the coil sides of groups 28 and 29 (pole 25) in slots 47 and 48 and in slots 49 and 50. The M.M.F. thus does not change at four places around the stator 1, with four flat peaks being created in the M.M.F. wave form. The overlapping coil sides of the two poles 24 and 25, i.e., the coils in slots 30—33 again produce additive M.M.F.'s contributing to the even progression of the wave form between the peaks. The end result, as for the two pole connection, is that a satisfactory wave form, relatively free of harmonics is produced.

From the above, it will be seen that I have provided a new and improved induction type electric motor which may be operated at either of two speeds. Both the main winding and the starting winding are so arranged that every other primary pole thereof may be reversed in polarity to provide for changing the rotative speed. In the case of both the main winding and the start winding a symmetrical, flat peaked M.M.F. pattern is produced for both speeds of operation and thereby the machine starts and runs efficiently at both speeds. In the main winding the desirable M.M.F. wave form results from the interspersing or overlapping of the outermost coil sides of the primary poles. With this overlapping arrangement, the outermost coil sides produce additive M.M.F.'s for one connection and cancelling M.M.F.'s for the other, whereby the wave form for both connections is symmetrical even though the wave has twice the number of poles. In the starting winding the desirable M.M.F. wave form results from the displacement of the two coil groups in each pole from each other, and from an overlapping of the outer coil sides of the poles. With the displacement within each pole, an M.M.F. cancelling effect is obtained, in my preferred embodiment, at two places on the core member for one connection, and at four places for the second connection. And as a result two flat peaks are formed for the two pole connection and four flat peaks for the four pole connection. The overlapping coil sides at the edges of the poles aid in both connections to produce a desirable wave progression between the peaks.

While in accordance with the patent statutes I have described what at present is considered to be the preferred embodiment of my invention, it will be obvious to those skilled in the art that various changes and modifications may be made herein without departing from the invention, and it is, therefore, aimed in the appended claims to cover all such changes and modifications as are within the true spirit and scope of the invention.

What I claim as new and desired to secure by Letters Patent of the United States is:

1. In a single phase induction type motor adapted to operate at two speeds, a magnetic core member having a plurality of slots, a winding disposed in said slots to form a predetermined number of primary poles, each of said poles comprising a number of coils, connections for reversing the polarity of every other pole, each primary pole having a polarity opposite the adjacent pole in one connection, and having a like polarity in a second connection thereby to create consequent poles between said primary poles, some of the outermost coil sides of each of said poles being positioned in the same slots as the outermost coil sides of the pole adjacent thereto for producing additive M.M.F.'s for one of said connections and cancelling M.M.F.'s for the other of said connections, thereby to provide a desirable wave form for both connections.

2. In a single phase induction type motor adapted to run at two speeds, a magnetic core member having a plurality of slots, a winding disposed in said slots to form a predetermined number of primary running poles, connections for reversing the polarity of every other one of said poles, each primary running pole having a polarity opposite the adjacent pole in one connection, and having a like polarity in another connection thereby to create consequent running poles between said primary running poles, a starting winding disposed in said slots to form a predetermined number of primary starting poles displaced in space from said primary running poles, each of said primary starting poles comprising a plurality of coil groups with each of said coil groups including a plurality of coils, connections for reversing the polarity of every other primary starting pole, each primary starting pole having a polarity opposite the adjacent pole in one connection and having a like polarity in a second connection thereby to create consequent starting poles between said primary starting poles, and the coil groups of each of said primary starting poles being displaced from each other in said slots so that corresponding coils of said groups do not fit into the same slots, thereby to provide a desirable wave form for both of said connections of said starting poles.

3. In a single phase induction type motor adapted to operate at two speeds, a magnetic core member having a plurality of slots, a winding disposed in said slots to form a predetermined number of primary running poles, connections for reversing the polarity of every other pole, each primary running pole having a polarity opposite the adjacent pole in one connection and having a like polarity in another connection thereby to create consequent running poles between said primary running poles, some of the outer coils of each of said primary poles being positioned in the same slots as the outermost coil sides of the primary pole adjacent thereto for producing additive M.M.F.'s for one connection and cancelling M.M.F.'s for the other of said connections thereby to provide a desirable M.M.F. wave form for both connections, a starting winding disposed in said slots to form a predetermined number of primary starting poles displaced in space from said primary running poles, each of said primary starting poles comprising a plurality of coil groups with each of said coil groups including a plurality of coils, connections for reversing the polarity of every other primary starting pole, each primary starting pole having a polarity opposite the adjacent pole in one connection and having a like polarity in a second connection, thereby to create consequent starting poles between said primary starting poles, and the coil groups of each of said primary starting poles being displaced from each other in said slots so that corresponding coils of said groups do not fit into the same slots, thereby to provide a desirable wave form for both connections of said primary starting poles.

4. In a single phase induction type motor adapted to operate at two speeds, a magnetic core member having a plurality of slots, a winding disposed in said slots to form a pair of primary poles, connections for reversing the polarity of one of said poles, said poles having a polarity opposite each other in one connection and having a like polarity in a second connection thereby to create consequent poles between said primary poles, the outermost two coils of both primary poles being positioned in the same slots for providing additive M.M.F.'s for said one connection and cancelling M.M.F.'s for said second connection, thereby to provide a desirable wave form from said second connection, said outermost two coils of both of said primary poles having approximately half the number of turns as the inner coils of said poles.

5. In a single phase induction type motor, a magnetic core member having a plurality of slots, a main winding disposed in said slots to form a predetermined number of running poles, connections for reversing the polarity of every other pole thereby to provide for running said motor at two different speeds, a starting winding disposed in said slots to form a predetermined number of primary starting poles displaced in space from said primary running poles, each of said primary starting poles comprising a pair of coil groups with each of said groups including a plurality of coils, connections for reversing the polarity of every other starting pole thereby to provide for starting said motor at said two different speeds, the coil groups of each of said starting poles being displaced from each other by three slots so that corresponding coils of said groups do not fit into the same slots and the outer two coil sides of each pole being fitted into the same slots as the outer coil sides of the adjacent pole, whereby a desirable M.M.F. wave form is provided by said starting winding for starting said motor in both speeds of operation.

6. In a two speed, single phase induction type motor having a magnetic core member including a plurality of slots, and a main winding disposed in said slots, a starting winding disposed in said slots to form a predetermined number of primary starting poles, each of said primary starting poles comprising a plurality of coil groups with each of said groups including a plurality of coils, connections for reversing the polarity of every other starting pole thereby to provide for starting said motor at two different speeds, the coil groups of each of said starting poles being displaced from each other by a predetermined number of slots so that corresponding coils of said groups do not fit into the same slots, and said poles overlapping with some of the outermost coil sides thereof fitting into the same slots, thereby to provide a desirable M.M.F. wave form for starting the motor in both speeds of operation.

No references cited.